March 5, 1940.  S. A. SNELL  2,192,534
METHOD OF MAKING JUVENILE AUTOMOBILE BODIES
Filed Nov. 15, 1937  4 Sheets-Sheet 3
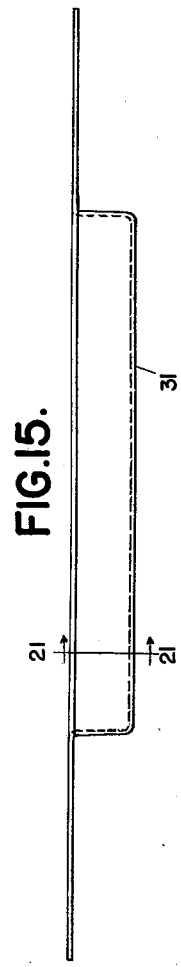
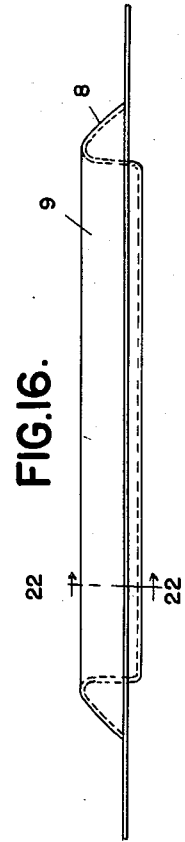
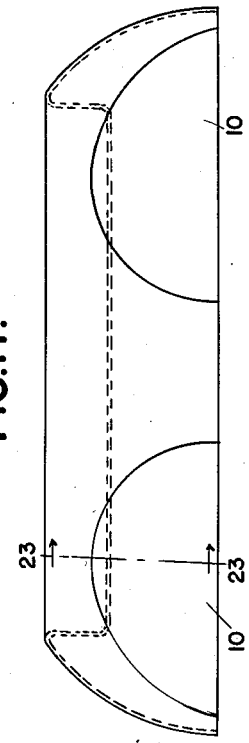
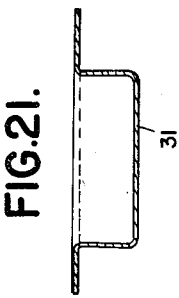
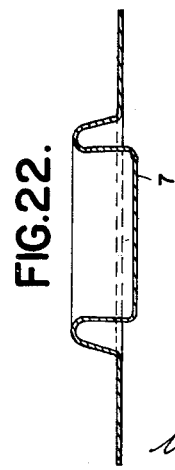
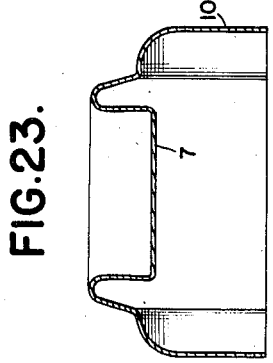
INVENTOR
SAMUEL A. SNELL
BY
ATTORNEYS March 5, 1940. S. A. SNELL 2,192,534
METHOD OF MAKING JUVENILE AUTOMOBILE BODIES
Filed Nov. 15, 1937 4 Sheets-Sheet 4
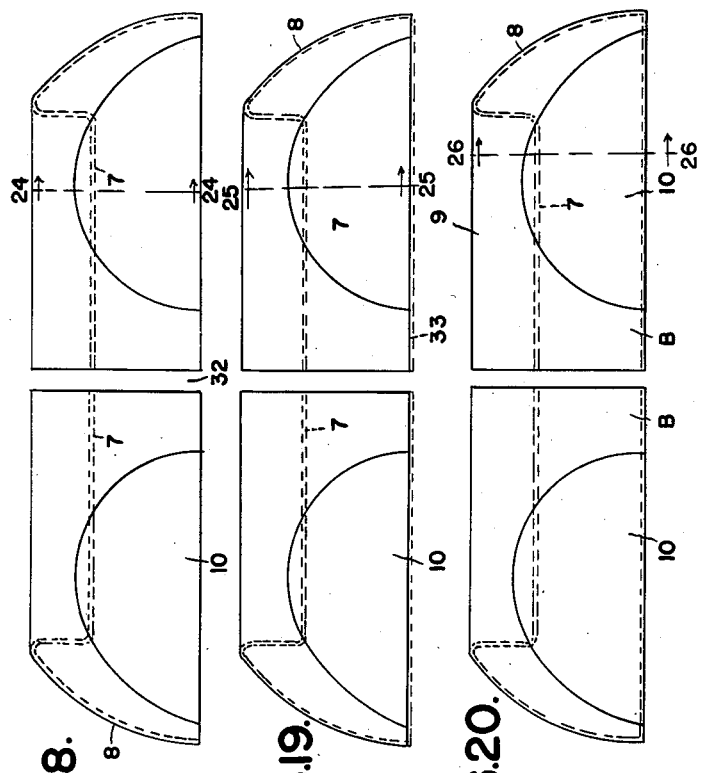
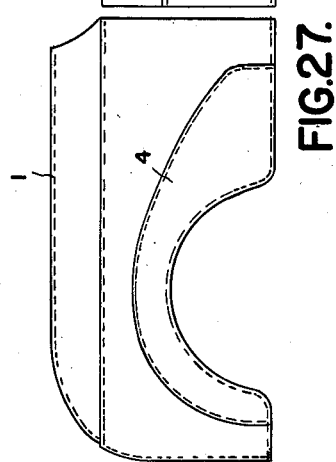
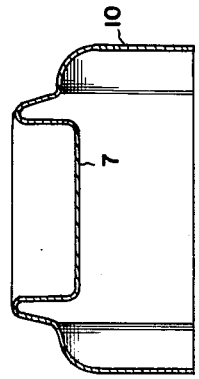
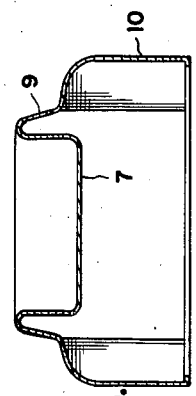
INVENTOR
SAMUEL A. SNELL
BY
ATTORNEYS Patented Mar. 5, 1940

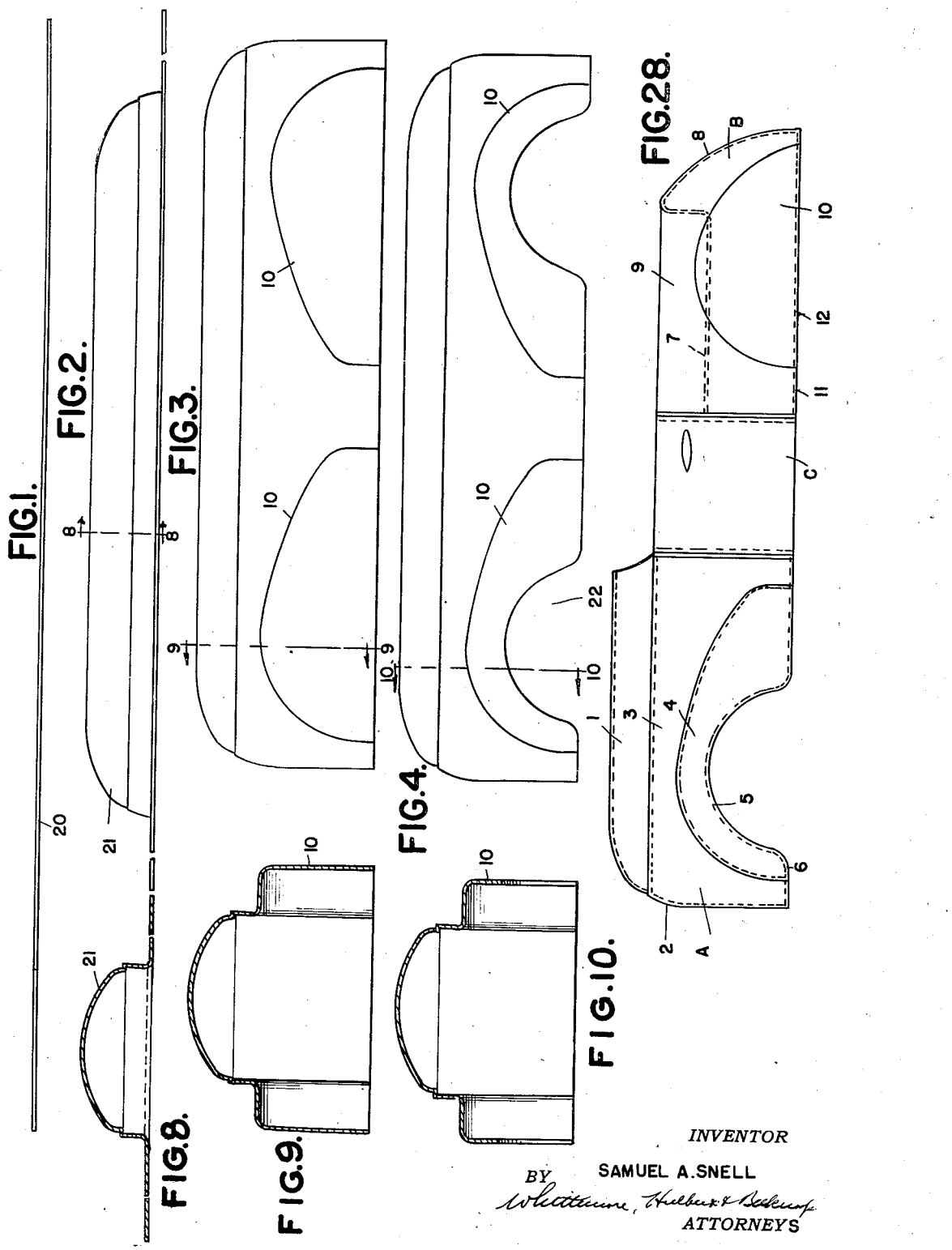

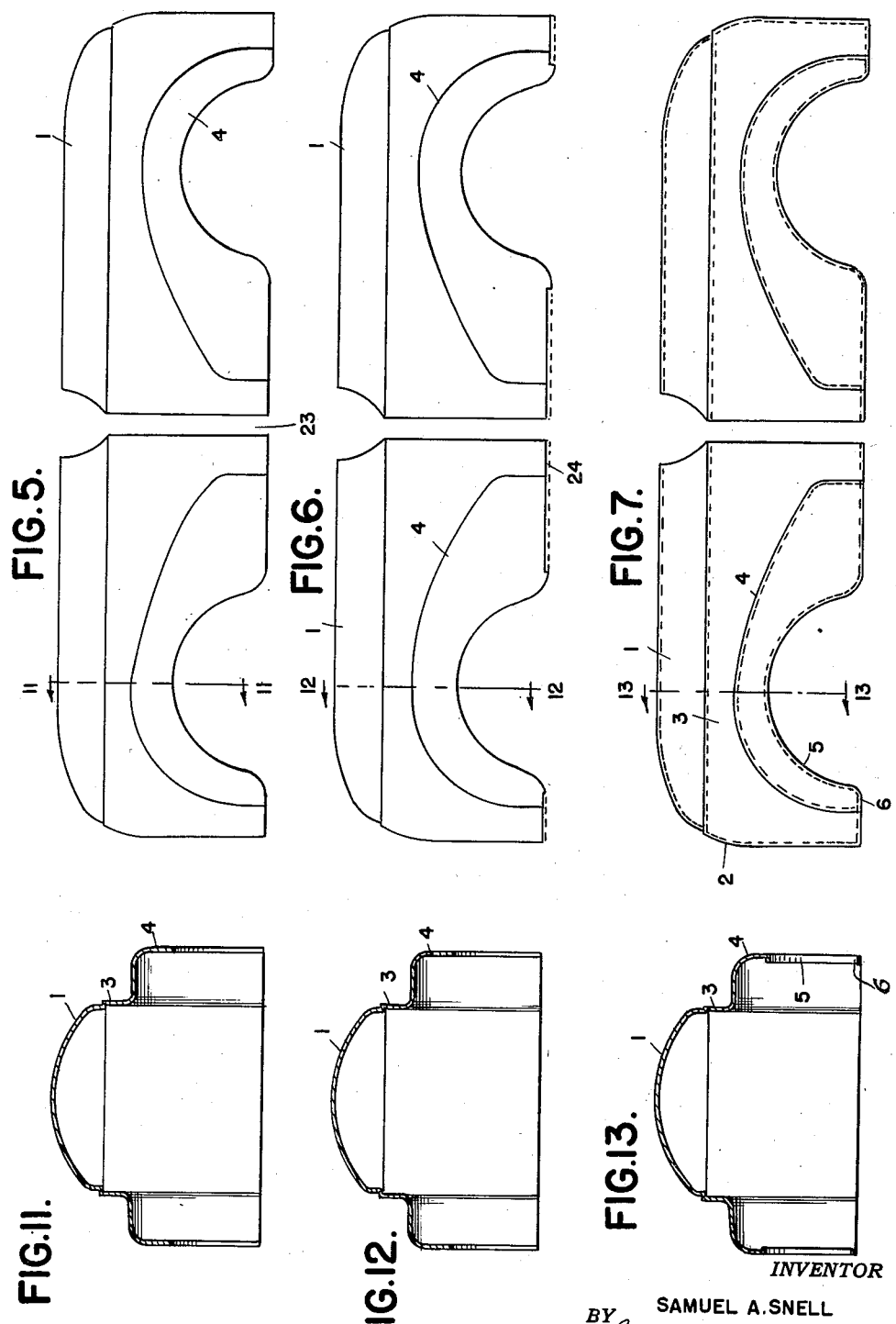

2,192,534

UNITED STATES PATENT OFFICE 2,192,534

METHOD OF MAKING JUVENILE AUTOMOBILE BODIES

Samuel A. Snell, Toledo, Ohio, assignor to The American-National Company, Toledo, Ohio, a corporation of Ohio Application November 15, 1937, Serial No. 174,705

9 Claims. (Cl. 113—116)

This invention relates generally to the manufacture of juvenile vehicle bodies and refers more particularly to the method of making such bodies from sheet metal.

Heretofore it has been customary when manufacturing juvenile vehicle bodies to form a lot of separate stampings and parts and to subsequently assemble them together to build up the bodies. This has required many different dies and fixtures as well as considerable time and expense for making and assembling the separate parts. Therefore, it is an object of the present invention to avoid this objectionable procedure by drawing an entire front end unit and an entire rear end unit of the body from sheet stock and to merely assemble therewith intermediate pressed metal side sections simulating doors to complete the body structure. In this connection my improved method contemplates the forming of two complete front end units from one sheet of metal and the forming of two complete rear end units from another sheet of metal. Thus, four such units may be provided in two drawing operations.

In the accompanying drawings:

Figure 1 is an edge elevation of the sheet metal blank from which two front end units are formed;

Figure 2 is an edge elevation of the sheet after the initial drawing operation;

Figure 3 is a side elevation of the sheet after the final drawing operation;

Figure 4 is a view similar to Figure 3, but showing the openings provided in the fenders for wheel clearance;

Figure 5 is a view similar to Figure 4, but showing the cut that is made in the structure to separate the two units from one another;

Figure 6 is a view similar to Figure 5, but showing the units after the lower edges thereof have been trimmed;

Figure 7 is a view similar to Figure 6 after the metal of the units at their lower edges has been turned inwardly to provide reinforcing flanges;

Figure 8 is a sectional view taken on the line 8—8 of Figure 2;

Figure 9 is a sectional view taken on the line 9—9 of Figure 3;

Figure 10 is a sectional view taken on the line 10—10 of Figure 4;

Figure 11 is a sectional view taken on the line 11—11 of Figure 5;

Figure 12 is a sectional view taken on the line 12—12 of Figure 6;

Figure 13 is a sectional view taken on the line 13—13 of Figure 7;

Figure 14 is an edge elevation of the sheet metal blank from which two rear end sections are formed;

Figure 15 is an edge elevation of the sheet illustrated in Figure 14 after the initial drawing operation;

Figure 16 is an edge elevation of the sheet illustrated in Figure 15 after the second drawing operation;

Figure 17 is a side elevation of the structure formed by the final drawing operation;

Figure 18 is a view similar to Figure 17, but showing the cut that is made in the structure to separate the two units from one another;

Figure 19 is a view similar to Figure 18, but showing the units after their lower edges have been trimmed;

Figure 20 is a view similar to Figure 19, but showing the units after their lower edges have been flanged inwardly;

Figure 21 is a sectional view taken on the line 21—21 of Figure 15;

Figure 22 is a sectional view taken on the line 22—22 of Figure 16;

Figure 23 is a sectional view taken on the line 23—23 of Figure 17;

Figure 24 is a sectional view taken on the line 24—24 of Figure 18;

Figure 25 is a sectional view taken on the line 25—25 of Figure 19;

Figure 26 is a sectional view taken on the line 26—26 of Figure 20;

Figure 27 is a side elevation of one front end unit and one rear end unit spaced apart before the intermediate side sections are welded thereto;

Figure 28 is a side elevation of the complete vehicle body made in accordance with my invention.

Referring now to the drawings and particularly to Figure 28 thereof, A is the front end unit, B is the rear end unit, and C are the intermediate side sections of the juvenile vehicle body made in accordance with my invention. As shown, the front end unit A is complete and comprises the arched hood 1, the rounded front wall 2, and the substantially parallel depending side walls 3 provided with outwardy projecting fender portions 4 of inverted substantially L-configuration. Inturned flanges 5 and 6, respectively, are provided at the lower edges of said sides 3 and fender portions 4 for reinforcing purposes. The rear end unit B is likewise complete and comprises the central seat portion 7, the rear deck 8, and the spaced substantially parallel depending side walls 9 provided with outwardly projecting fender portions 10 of inverted substantially L-configuration. Inturned flanges 11 and 12, respectively, are provided at the lower edges of said sides 9 and fender portions 10 for reinforcing purposes. The intermediate side sections C simulate doors and are welded to the adjacent edges of the front and rear units A and B, respectively, to form the complete body.

In the process of construction, two front end units such as A are drawn from a single sheet 20 of predetermined area (Figure 1). Initially the metal of the sheet 20 is drawn at the center to form an inverted trough-shaped portion 21 (Figure 2) for two hoods such as 1, and the upper portions of the front end and side walls 2 and 3, respectively, of the units. The metal at the marginal portions of the sheet is then drawn downwardly to form the balance of the front end and side walls 2 and 3, and outwardly to form the fenders 4 of the units. Following the drawing operations, the outer depending walls of the fenders are cut away as at 22 (Figure 4) for wheel clearance. The structure thus far formed is then cut in two substantially midway of its ends as indicated at 23 (Figure 5) to provide two identical front end units. The lower edges of each unit A are then trimmed as at 24 (Figure 6), and following the trimming operation the metal of each unit at the lower edges thereof is turned in as illustrated in Figure 7 to provide the reinforcing flanges 5 and 6. Thus, two front end units are provided from the blank 20.

Likewise, two rear end units such as B are drawn from a single sheet 30 of metal (Figure 14). Initially the metal of sheet 30 is drawn at the center to form a substantially rectangular trough 31 (Figure 15). The metal at the marginal portions of the sheet is then drawn outwardly and downwardly as illustrated in Figure 16 to form the upper portions of the decks 8 and side walls 9 of the units, and is subsequently drawn downwardly to form the balance of the decks 8 and side walls 9 and outwardly to form the fenders 10 as illustrated in Figure 17. Following the drawing operations just mentioned the structure so formed is cut in two substantially midway of its ends as indicated at 32 (Figure 18) to provide two identical rear end units. The lower edges of each unit B so formed is then trimmed as at 33 (Figure 19), and following the trimming operations the metal of each unit B at the lower edge thereof is turned in as illustrated in Figure 20 to provide the reinforcing flanges 11 and 12. Thus, two rear end units B are provided from the single blank 30.

After being formed as described, one of the front end units A and one of the rear end units B are spaced apart the proper distance according to the width of the intermediate sections C used. The intermediate sections C simulating doors are formed separately as stampings and constitute inserts between these front and rear units A and B, respectively. Such inserts C are then rigidly secured, preferably by welding operations to the adjacent side edges of the spaced front and rear units A and B to complete the vehicle body, as illustrated in Figure 28.

Instead of making two identical front end portions from a single sheet of metal and two identical rear end portions from another sheet for the same model of juvenile automobile body, as described above, I also contemplate making two dissimilar front end portions from one sheet and two dissimilar rear end portions from another sheet in the same manner and sequence described for the manufacture of two different models of juvenile automobile bodies. Thus, one of the front end portions and one of the rear end portions so formed would go into one model, and the other front end portion and rear end portion would go into a different model. As a result, I can manufacture two different models by the same method.

What I claim as my invention is:

1. The method of making elongated juvenile vehicle bodies of the type in which a child rides, each having longitudinally spaced front and rear units and intermediate side panel sections, each front unit having a hood and integral depending end and side walls, and each rear unit having a seat and integral depending end and side walls, including the steps of forming two complete front end units aforesaid from one sheet of metal, by drawing said sheet at the center thereof to form a substantially rectangular trough, drawing the sheet at the margins thereof to form the end and side walls, dividing said sheet transversely at a predetermined point to provide two separate front end units, similarly forming two complete rear end units from another sheet of metal, forming the side sections from separate sheets of metal, spacing the front and rear units so formed a predetermined distance apart according to the length of body desired, and welding the side panel sections to the contiguous edge portions of said front and rear units.

2. The method of making elongated juvenile vehicle bodies of the type in which a child rides, each having longitudinally spaced front and rear end units and intermediate side panel sections, each front end unit having a hood and integral depending front and side walls, and each rear end unit having a seat and integral depending rear and side walls, including the steps of drawing the metal of a single sheet of metal to form an inverted trough from which the hoods of the front end units may be formed, and to form the upper portions of the front and side walls of the front end units, drawing the metal at the marginal portions of said sheet to form the remainder of the front and side walls of said front end units, cutting the metal of said sheet at a predetermined point to provide two separate front end units, each with a hood, drawing the metal of a second sheet to form a substantially rectangular trough from which the seats of the rear end units may be formed, and to form the upper portions of the rear and side walls of the rear end units, drawing the metal at the marginal portions of said second sheet to form the remainder of the rear and side walls of said rear end units, cutting the metal of said second sheet at a predetermined point to provide two separate rear end units, each with a seat, forming separately from sheet metal the intermediate side panel sections, spacing the front and rear end units a predetermined distance apart according to the length of bodies desired, and rigidly securing the intermediate side panel sections to the contiguous edge portions of said spaced front and rear end units.

3. The method of making elongated juvenile vehicle bodies of the type in which a child rides, each having longitudinally spaced front and rear end units and intermediate side panel sections, each front end unit thereof having a hood and integral depending front and side walls with portions of said side walls projecting laterally outward and constituting fenders, and each rear end unit thereof having a seat and integral depending rear and side walls with portions of said side walls projecting laterally outward and constituting fenders; including the steps of drawing the metal of one sheet of metal to form the hoods and integral depending front and side walls with fender portions of two front end units, cutting said sheet at a predetermined point to separate such front end units from each other, drawing the metal of a second sheet of metal to form the seats and integral depending rear and side walls with fender portions of two rear end units, cutting the second sheet to separate the rear end units from each other, forming separately from sheet metal the intermediate side panel sections, spacing the front and rear units a predetermined distance apart according to the length of body desired, and rigidly securing the intermediate side panel sections to the contiguous edge portions of the side walls of said front and rear units.

4. The method of making elongated juvenile vehicle bodies of the type in which a child rides, each having longitudinally spaced front and rear end units and intermediate side panel sections, each front end unit thereof having integral depending front and side walls, and each rear end unit thereof having integral depending rear and side walls; including the steps of forming from one sheet of metal the integral depending front and side walls of two front end units, cutting said sheet to separate such front end units from each other, forming from a second sheet of metal the integral depending rear and side walls of two rear end units, cutting the second sheet to separate such rear end units from each other, forming separately from sheet metal the intermediate side panel sections, spacing the front and rear units a predetermined distance apart according to the length of body desired, and rigidly securing the intermediate side panel sections to the contiguous edge portions of the side walls of said front and rear units.

5. The method of making elongated juvenile vehicle bodies of the type in which a child rides, each having longitudinally spaced front and rear units and intermediate side panel sections, each front unit having a hood and integral depending front and side walls, and each rear unit having a seat and integral depending rear and side walls, including the steps of forming from one sheet of metal the hoods and depending side walls of two of said front end units, cutting the metal of said sheet at a predetermined point to separate said front end units so formed from each other, forming from a second sheet of metal the seats and depending rear and side walls of two of said rear end units, cutting the metal of said second sheet at a predetermined point to separate said rear end units so formed from each other, forming separately from sheet metal the intermediate side panel sections, spacing the front and rear units a predetermined distance apart according to the length of body desired, and rigidly securing the intermediate side panel sections to the contiguous edge portions of said front and rear units.

6. The method of making elongated juvenile vehicle bodies of the type in which a child rides, each having longitudinally spaced front and rear end units and intermediate side panel sections, each front end unit thereof having integral depending front and side walls with portions of said side walls projecting laterally outward and constituting fenders, and each rear end unit thereof having integral depending rear and side walls with portions of said side walls projecting laterally outward and constituting fenders; including the steps of forming from one sheet of metal the integral depending front and side walls and laterally projecting fender portions of two front end units, cutting said sheet to separate such front end units from each other, forming from a second sheet of metal the integral depending rear and side walls and laterally projecting fender portions of two rear end units, cutting the second sheet to separate such rear end units from each other, forming separately from sheet metal the intermediate side panel sections, spacing the front and rear units a predetermined distance apart according to the length of body desired, and welding the intermediate side panel sections to the contiguous edge portions of the side walls of said front and rear units.

7. The method of making elongated juvenile vehicle bodies of the type in which a child rides, each having longitudinally spaced front and rear end units and intermediate side panel sections, each front end unit having a hood and integral depending front and side walls with portions of said side walls projecting laterally outward and constituting fenders, and each rear end unit having a seat and integral depending rear and side walls with portions of said side walls projecting laterally outward and constituting fenders, including the steps of drawing the metal of a single sheet of metal to form an inverted trough from which the hoods of the front end units may be formed, and to form the upper portions of the front and side walls of the front end units, drawing the metal at the marginal portions of said sheet to form the remainder of the front and side walls and laterally projecting fender portions of said front end units, cutting the metal of said sheet at a predetermined point to provide two separate front end units, each with a hood, drawing the metal of a second sheet to form a substantially rectangular trough from which the seats of the rear end units may be formed, and to form the upper portions of the rear and side walls of the rear end units, drawing the metal at the marginal portions of said second sheet to form the remainder of the rear and side walls and laterally projecting fender portions of said rear end units, cutting the metal of said second sheet at a predetermined point to provide two separate rear end units, each with a seat, forming separately from sheet metal the intermediate side panel sections, spacing the front and rear end units a predetermined distance apart according to the length of the bodies desired, and rigidly securing the intermediate side panel sections to the contiguous edge portions of said spaced front and rear end units.

8. The method of making elongated juvenile vehicle bodies of the type in which a child rides, each having longitudinally spaced front and rear units and intermediate side panel sections, each front unit having a hood and integral depending front and side walls, and each rear unit having a seat and integral depending rear and side walls, including the steps of forming two complete front end units aforesaid from one sheet of metal by initially drawing the metal of the sheet at the center to form a substantially rectangular inverted trough from which the hoods may be formed, and to form the upper portions of the front and side walls of the front end units, then drawing downwardly the marginal portions of the sheet to form the remainder of the front and side walls of the front end units, cutting away portions of the side walls of the front end units for wheel clearance, dividing the sheet transversely at a predetermined point to provide two separate front end units, turning in the metal of each front end unit at the lower edges thereof to provide reenforcing flanges, forming two complete rear end units aforesaid from another sheet of metal by initially drawing the metal of the sheet at the center to form a substantially rectangular trough from which the seats may be formed, then drawing the metal at the marginal portions of said second mentioned sheet outwardly and downwardly to form the upper portions of the rear and side walls of the rear end units, then drawing downwardly still further the marginal portions of the second mentioned sheet to form the remainder of the rear and side walls of the rear end units, dividing the second mentioned sheet transversely at a predetermined point to provide two separate rear end units, turning in the metal of each rear end unit at the lower edges thereof to provide reenforcing flanges, forming the side sections from separate sheets of metal, spacing the front and rear units so formed a predetermined distance apart according to the length of body desired, and rigidly securing the side panel sections to the contiguous edge portions of said front and rear units.

9. The method of making elongated juvenile vehicle bodies of the type in which a child rides, each having longitudinally spaced front and rear units and intermediate side panel sections, each front unit having a hood and integral depending front and side walls, and each rear unit having a seat and integral depending rear and side walls, including the steps of forming two complete front end units aforesaid from one sheet of metal by initially drawing the metal of the sheet at the center to form a substantially rectangular inverted trough from which the hoods may be formed, and to form the upper portions of the front and side walls of the front end units, then drawing downwardly the marginal portions of the sheet to form the remainder of the front and side walls of the front end units, dividing the sheet transversely at a predetermined point to provide two separate front end units, forming two complete rear end units aforesaid from another sheet of metal by initially drawing the metal of the sheet at the center to form a substantially rectangular trough from which the seats may be formed, then drawing the metal at the marginal portions of said second mentioned sheet outwardly and downwardly to form the upper portions of the rear and side walls of the rear end units, then drawing downwardly still further the marginal portions of the second mentioned sheet to form the remainder of the rear and side walls of the rear end units, dividing the second mentioned sheet transversely at a predetermined point to provide two separate rear end units, forming the side sections from separate sheets of metal, spacing the front and rear units so formed a predetermined distance apart according to the length of body desired, and rigidly securing the side panel sections to the contiguous edge portions of said front and rear units.

SAMUEL A. SNELL.